US006801765B1

United States Patent
Roo et al.

(10) Patent No.: US 6,801,765 B1
(45) Date of Patent: Oct. 5, 2004

(54) LOCKING AND UNLOCKING METHOD IN MOBILE TELEPHONE

(75) Inventors: Kyung-Yun Roo, Kyongsangbuk-do (KR); Youn-Man Lee, Kyongsangbuk-do (KR); Yong-Duck Hwang, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/473,223

(22) Filed: Dec. 27, 1999

(30) Foreign Application Priority Data

Dec. 26, 1998 (KR) .......................................... 1998-59047
Dec. 30, 1998 (KR) .......................................... 1998-60916
Oct. 5, 1999 (KR) .......................................... 1999-42930

(51) Int. Cl.$^7$ .............................. H04M 1/66; H04M 1/68
(52) U.S. Cl. ........................ 455/411; 455/563; 455/575
(58) Field of Search .................................. 455/410, 411, 455/422, 563, 565, 566, 550, 575; 379/93.03, 88.01, 88.02, 189, 903; 340/5.1, 5.8, 5.81, 5.84, 5.85; 704/231, 246, 275

(56) References Cited

U.S. PATENT DOCUMENTS 5,046,125 A * 9/1991 Takizawa .................... 455/411
5,241,583 A * 8/1993 Martensson ................. 455/565
5,646,604 A * 7/1997 Maruyama et al. ......... 455/411
5,749,052 A * 5/1998 Hidem et al. ............... 455/422
6,195,568 B1 * 2/2001 Irvin .......................... 455/563

FOREIGN PATENT DOCUMENTS

JP          09064967 A    *  3/1997

* cited by examiner

Primary Examiner—Quochien Vuong
(74) Attorney, Agent, or Firm—Dilworth & Barrese, LLP (57) ABSTRACT

Disclosed is a method for locking and unlocking a mobile telephone. The method comprises setting a locking mode by receiving a locking voice, a locking-wait time and a locking number; receiving a locking voice when there is a key input in the locking mode; partially releasing the locking function when the received locking voice is identical to a registered locking voice; switching an operation mode of the mobile telephone to an idle mode, after partially releasing the locking function; and switching the operation mode of the mobile telephone back to the locking mode, when there is no key input in the idle mode until the locking-wait time has elapsed.

12 Claims, 9 Drawing Sheets

FIG. 6B

LOCKING AND UNLOCKING METHOD IN MOBILE TELEPHONE

This application claims priority to an application entitled "Locking and Unlocking Method in Mobile Telephone" filed in the Korean Industrial Property Office on Dec. 26, 1998 and assigned Serial No. 98-59047, the contents of which are hereby incorporated by reference.

BACKGROUND OF THE INVENTION

1. Field of the Invention

The present invention relates generally to a mobile telephone, and in particular, to a locking and unlocking method in a mobile telephone.

2. Description of the Related Art

As the popularity of mobile telephones increases, the potential for fraudulent use of the mobile telephone also increases. Therefore, most mobile telephones have a locking function using a locking number (or password). In this case, one other than the user who knows the password can unlock the mobile telephone by inputting the password. Therefore, it is not possible to completely prevent the fraudulent use. In addition, the user must input the password containing several numerals one by one in order to unlock the mobile telephone. This is an annoyance for the mobile user, as the inputting of the password may obstruct careful driving and must be repeated upon completion of the call.

Moreover, when the mobile telephone is missing and in an unlocked state, it is not possible to prevent the fraudulent use.

SUMMARY OF THE INVENTION

It is, therefore, an object of the present invention to provide a method for locking and unlocking a mobile telephone by using a voice.

It is another object of the present invention to provide a method for locking a partially unlocked mobile telephone again after a lapse of a predetermined time.

It is yet another object of the present invention to provide a method for automatically locking and unlocking a mobile telephone in an idle mode after a lapse of a predetermined time.

To achieve the above objects, there is provided a method for locking and unlocking a mobile telephone. The method comprises setting a locking mode by receiving a registered locking voice, a registered locking-wait time and a registered locking number; receiving a locking voice when there is a key input in the locking mode; partially releasing the locking function when the received locking voice is identical to the registered locking voice; switching an operation mode of the mobile telephone to an idle mode after partially releasing the locking function; and switching the operation mode of the mobile telephone back to the locking mode when there is no key input in the idle mode until the locking-wait time has elapsed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
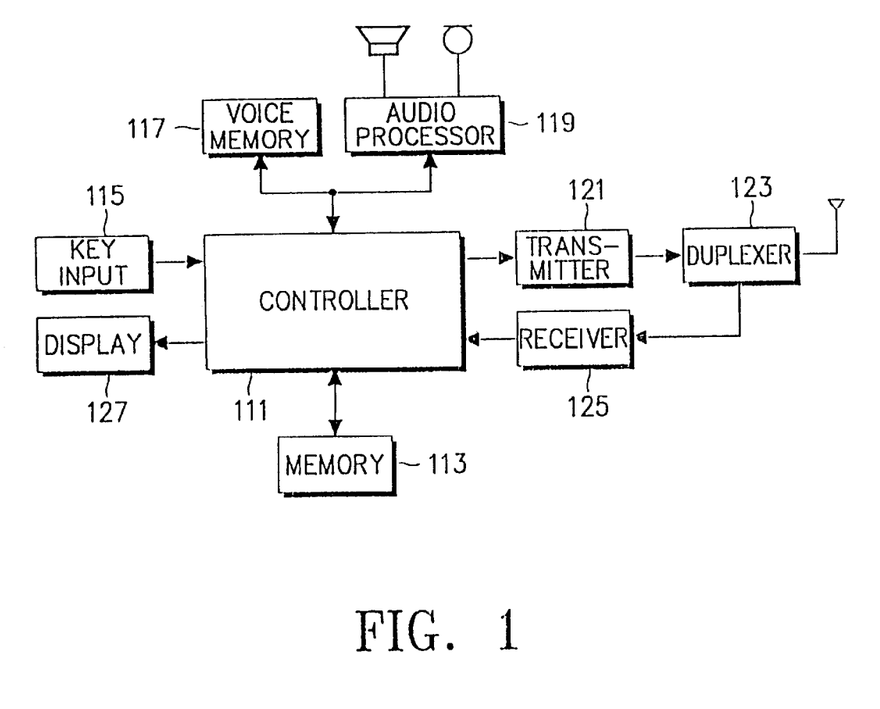
FIG. 1 is a block diagram illustrating a mobile telephone to which the present invention is applicable.

Referring to FIG. 1, there is shown a block diagram of a mobile telephone to which the present invention is applicable. A controller 111 controls the overall operation of the mobile telephone. A memory 113 stores a control program of the mobile telephone, and control data generated from the controller 111. A key input device 115 includes a plurality of dialing digit keys, a MENU key and a SEND key, and generates a key signal corresponding to a key selected by the user and provides the generated key signal to the controller 111. In the embodiment of the present invention, a specific key such as a voice locking function setting key and a voice locking function release key can be set by combination of the keys prepared in the key input device 115.

A voice memory 117 stores a plurality of voice messages. Particularly, the voice memory 117 stores (1) a locking-voice input request voice message requesting input of a locking voice, (2) a locking-wait time input request voice message requesting input of locking-wait time, (3) a locking-number input request voice message requesting input of a locking number, (4) a locking-voice input request voice message requesting input of a locking voice for partially releasing the voice locking function, (5) a locking-number input request voice message requesting input of a locking number for completely releasing the voice locking function, and (6) an input registered locking voice.

An audio processor 119, under the control of the controller 111, converts a voice message read from the voice memory 117 into an analog signal and outputs it through a speaker. In addition, the audio processor 119 converts an analog signal input from a microphone into a digital signal.

A transmitter 121 modulates a signal provided from the controller 111 into a radio signal. A duplexer 123 transmits the radio signal provided from the transmitter 121 via an antenna, and provides a radio signal received from the antenna to a receiver 125. The receiver 125 demodulates the radio signal provided from the duplexer 123 and provides the demodulated signal to the controller 111. The controller 111 controls a call according to the demodulated signal provided from the receiver 125. A display 127, which is comprised of an LCD (Liquid Crystal Display) or an LED (Light Emitting Device), displays operating states of the mobile telephone, under the control of the controller 111.

Figure 2A:
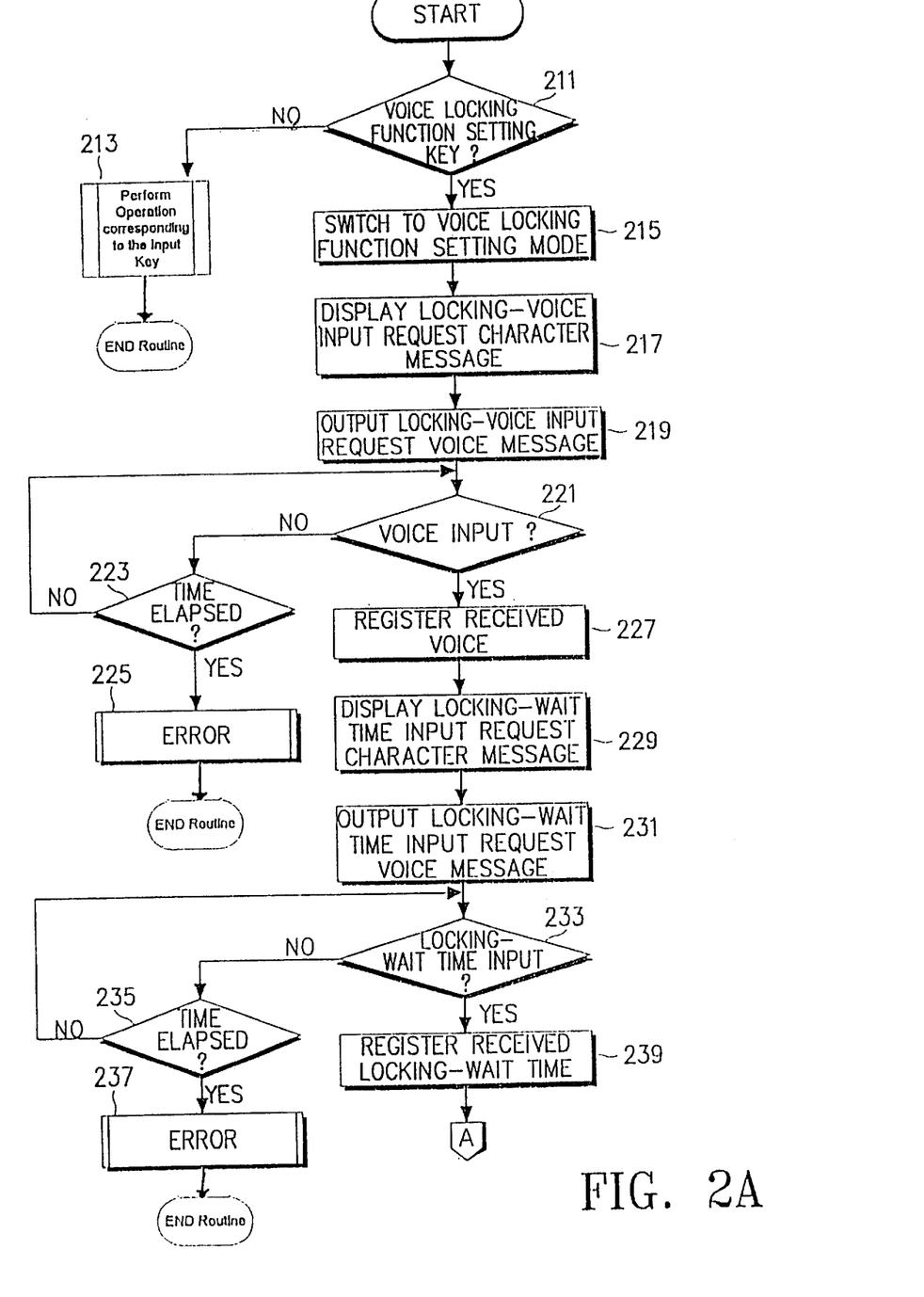
FIGS. 2A and 2B are flow charts illustrating a procedure for setting a voice locking function according to an embodiment of the present invention.

Referring now to FIG. 2A, there is shown a procedure for setting a voice locking function according to an embodiment of the present invention. Controller 111 scans the key input device 115 at stated periods in step 211 to determine whether a voice locking function setting key is input or not. The voice locking function setting key is defined by combination of the keys prepared in the key input device 115. Upon receipt of an input key other than the voice locking function setting key, the controller 111 performs an operation corresponding to the input key in step 213 and then the routine ends.

However, upon receipt of the voice locking function setting key, the controller 111 switches an operation mode of the mobile telephone to a voice locking function setting mode in step 215. Thereafter, in step 217, the controller 111 accesses the memory 113 to read a locking-voice input request character message such as "Please, input a locking voice", and displays the read character message on the display 127. Subsequently, in step 219, the controller 111 access the voice memory 117 to read a locking-voice input request voice message such as "Please, input a locking voice", converts the read voice message to an analog signal using the audio processor 119, and then outputs it through the speaker. The controller 111 then determines in step 221 whether a voice signal is input by the user through the microphone. When no voice signal is input, the controller 111 repeatedly examines in step 223 whether a predetermined time, for example, 5 seconds has elapsed or not. When the predetermined time has elapsed, the controller 111 remedies the error condition in step 225 and then the routine ends.

When a voice signal is input by the user in step 221, the controller 111 converts the input voice signal to a digital signal through the audio processor 119 and stores the converted digital signal as a registered locking voice in the voice memory 117, in step 227. Thereafter, in step 229, the controller 111 accesses the memory 113 to read a locking-wait time input request character message such as "Please, input locking-wait time", and displays the read character message on the display 127. Here, the "locking-wait time" refers to a waiting time required when the mobile telephone is set back to the voice locking mode because no key input is received after the voice locking function is partially released. In step 231, the controller 111 accesses the voice memory 117 to read a locking-wait time input request voice message such as "Please, input locking-wait time", converts the read voice message to an analog signal using the audio processor 119, and then outputs it through the speaker. The controller 111 determines in step 233 whether the locking-wait time is input or not. The locking-wait time may be input using the keys prepared in the key input device 115. When the locking-wait time is not input, the controller 111 determines in step 235 whether a predetermined time, for example, 3 seconds has elapsed or not. When the predetermined time has elapsed, the controller 111 remedies the error condition in step 237 and then the routine ends. When the locking-wait time is input in the step 233, the controller 111 registers the input locking-wait time in the memory 113 in step 239.

Figure 2B:
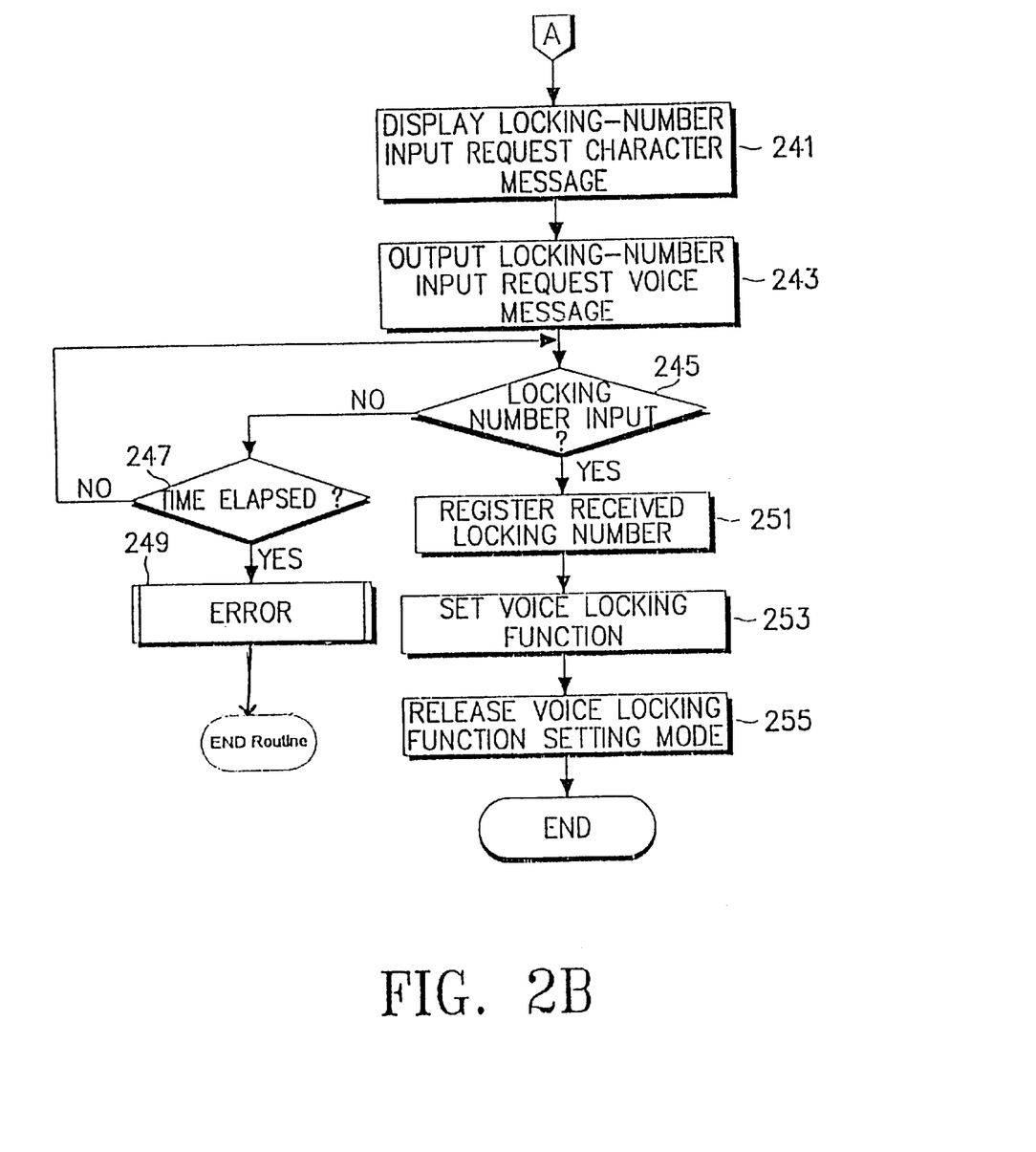

Referring now to FIG. 2B, there is shown the continuation of the procedure for setting a voice locking function according to an embodiment of the present invention. Referring to step 241, the controller 111 accesses the memory 113 to read a character message requiring input of a locking number for completely releasing the voice locking function, such as "Please, input a locking number", and displays the read character message on the display 127. In step 243, the controller 111 accesses the voice memory 117 to read a voice message requiring input of the locking number such as "Please, input a locking number", converts the read voice message to an analog signal using the audio processor 119, and then outputs it through the speaker. The controller 111 scans the key input device 115 in step 245, to determine whether the locking number has been input. When the locking number is not input, the controller 111 determines in step 247 whether a predetermined time, for example, 3 seconds has elapsed or not. When the predetermined time has elapsed, the controller 111 remedies the error condition in step 249 and then the routine ends.

However, when the locking number has been input in step 245, the controller 111 registers the input locking number in the memory 113 in step 251. Then, the controller 111 sets the voice locking function in step 253, and releases the voice locking function setting mode in step 255.

As described above, in the voice locking function setting procedure of FIGS. 2A and 2B, the mobile telephone sets the locking voice, locking-wait time and locking number.

Figure 3A:
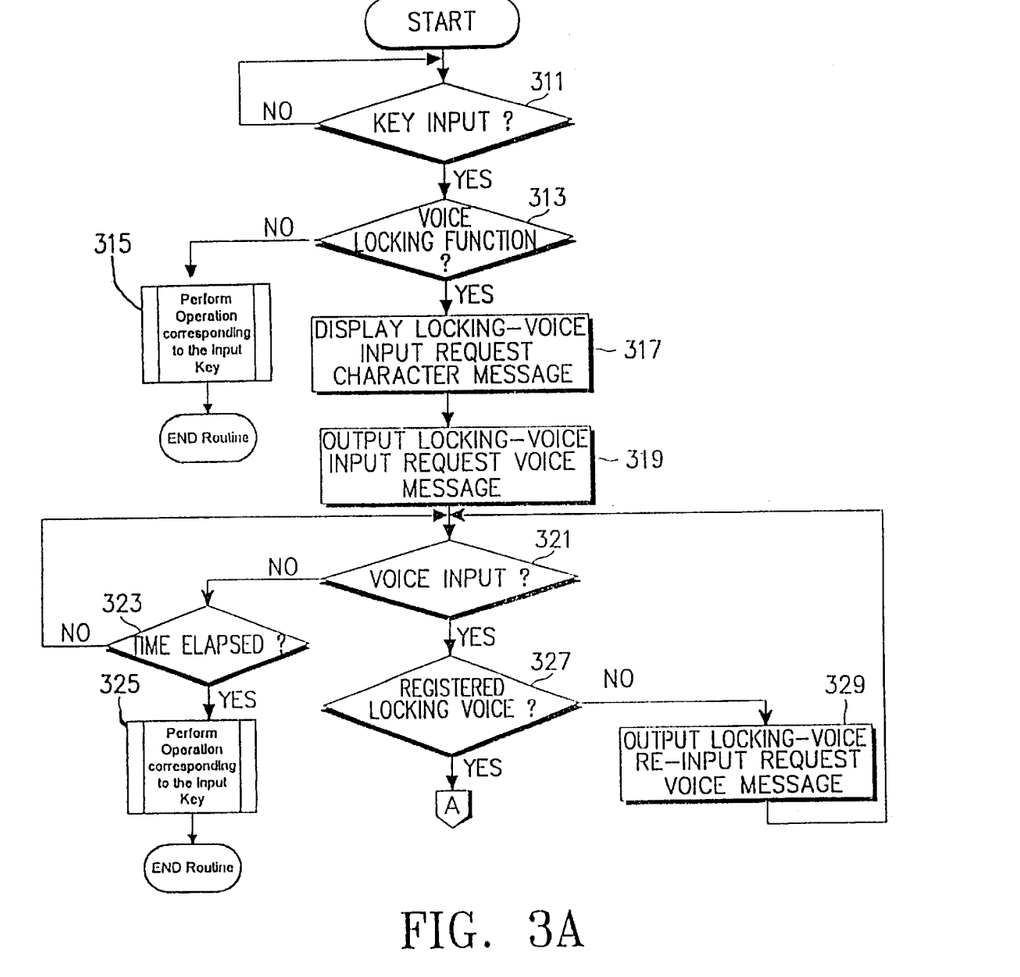
FIGS. 3A and 3B are flow charts illustrating a voice locking/unlocking procedure according to an embodiment of the present invention.

Referring to FIG. 3A, there is shown a voice locking/unlocking procedure according to an embodiment of the present invention. The controller 111 scans the key input device 115 in step 311, to determine whether a key is input. When a key is input, the controller 111 determines in step 313 whether the voice locking function is set in the mobile telephone. When the voice locking function is not set, the controller 111 performs an operation corresponding to the input key in step 315 and ends the routine.

However, when the voice locking function is set, the controller 111 accesses the memory 113 to read a locking-voice input request character message such as "Please, input a locking voice", and displays the read character message on the display 127, in step 317. Thereafter, in step 319, the controller 111 accesses the voice memory 117 to read a locking-voice input request voice message such as "Please, input a locking voice", converts the read voice message to an analog signal using the audio processor 119, and outputs it through the speaker. The controller 111 determines in step 321 whether a voice signal is input by the user through the microphone. When no voice signal is input, the controller 111 determines in step 323 whether a predetermine time, for example, 3 seconds has elapsed or not. When the predetermined time has elapsed, the controller 111 remedies the error condition in step 325 and then the routine ends.

When the voice signal is input in step 321, the controller 111 determines in step 327 whether the input voice signal corresponds to a locking voice registered in the voice memory 117. When the input voice signal does not correspond to the registered locking voice, the controller 111 accesses the voice memory 117 to read a locking-voice re-input request voice message such as "Unregistered locking voice. Please, input the locking voice again", processes the read voice message to an analog signal using the audio processor 119, and outputs the analog voice signal through the speaker, in step 329. In the embodiment, the number of re-inputting the locking voice is limited to 3.

Figure 3B:
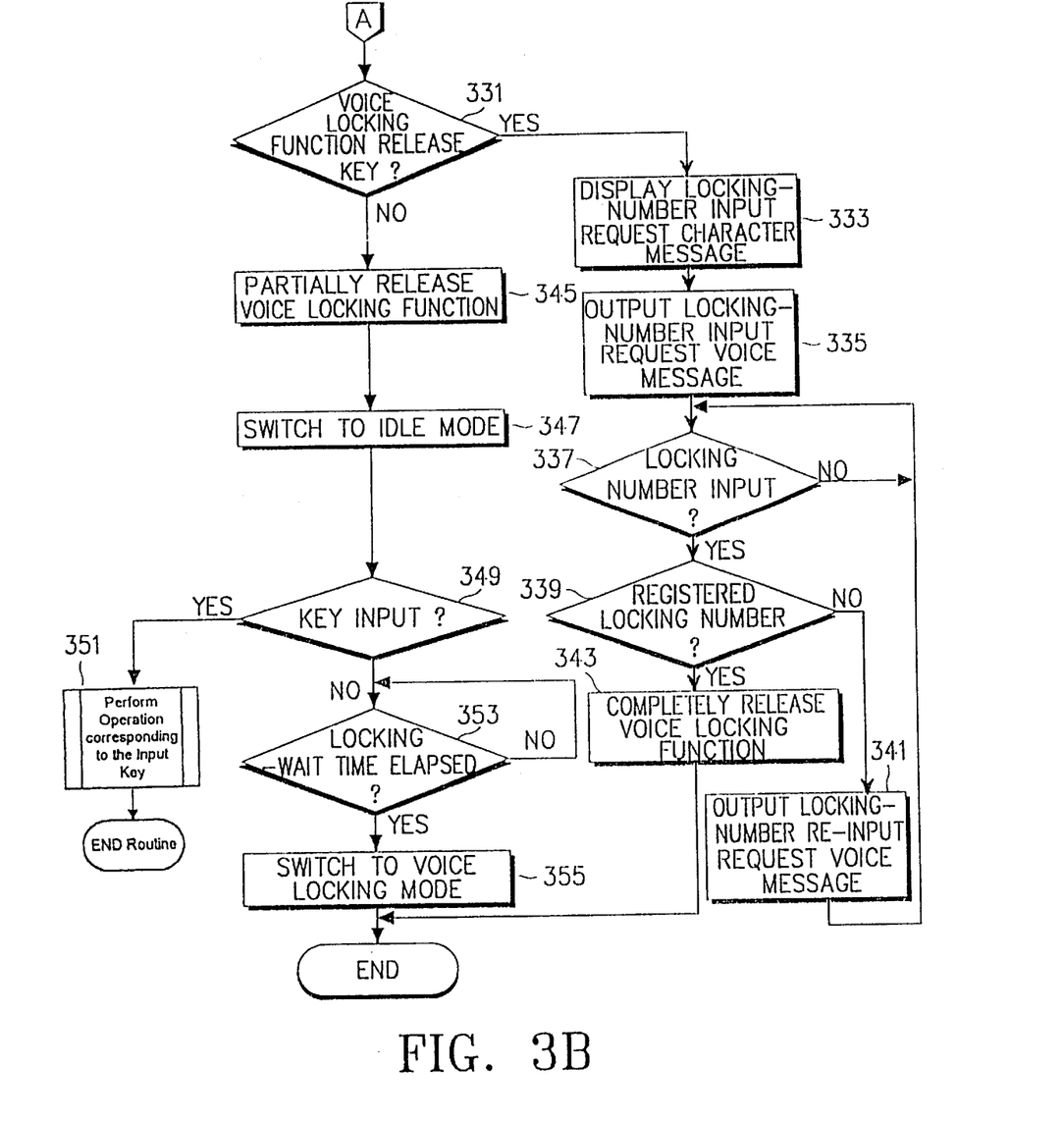

Referring now to FIG. 3B, there is shown a continuation of the voice locking/unlocking procedure according to an embodiment of the present invention. When the input voice signal corresponds to the registered voice in step 327 of FIG. 3A, the controller 111 scans the key input device in step 331, to determine whether a voice locking function release key is input or not. The voice locking function release key is defined by combination of the keys prepared in the key input device 115. When it is determined in step 331 that the voice locking function release key is input, the controller 111 accesses the memory 113 to read a locking-number input request character message such as "Please, input a locking number", and displays the read character message on the display 127, in step 333. Thereafter, in step 335, the controller 111 accesses the voice memory 117 to read a locking-number input request voice message such as "Please, input the locking number", converts the read voice message to an analog signal using the audio processor 119, and outputs the converted analog voice signal through the speaker. The controller 111 scans the key input device 115 in step 337, to determine whether the locking number has been input or not. If it is determined that the locking number has been input, the controller 111 examines in step 339 whether the input locking number is identical to a locking number registered in the memory 113. When the input locking number is not identical to the registered locking number, the controller 111 accesses the voice memory 117 to read a locking number re-input request voice message such as "Unregistered locking number. Please, input the locking number again", converts the read voice message to an analog signal using the audio processor 119, and outputs the converted analog voice signal through the speaker, in step 341. Thereafter, the procedure returns to the step 337. In the embodiment, the number of re-inputting the locking number is limited to 2, by way of example.

However, if it is determined in step 339 that the input locking number is identical to the registered locking number, the controller 111 completely releases the voice locking function in step 343 and ends the routine.

Further, if it is determined in step 331 that the voice locking function release key is not input, the controller 111 partially releases the voice locking function in step 345 and switches an operation mode of the mobile telephone to the idle mode in step 347. The controller 111 scans the key input device 115 in step 349, to determine whether a key is input. When a key is input, the controller 111 performs the other operation corresponding to the key input in step 351 and ends the routine. However, when no key is input, the controller 111 determines in step 353 whether a locking-wait time, for example, 30 minutes has elapsed or not. When the locking-wait time has elapsed, the controller 111 switches an operation mode of the mobile telephone to a voice locking mode in step 355 and ends the routine.

In the voice locking/unlocking procedure of FIGS. 3A and 3B, the voice locking function is partially released using the locking voice so as to enable the user to perform the call, and the voice locking function is automatically and repeatedly set when there is no key input for the locking-wait time.

Figure 4:
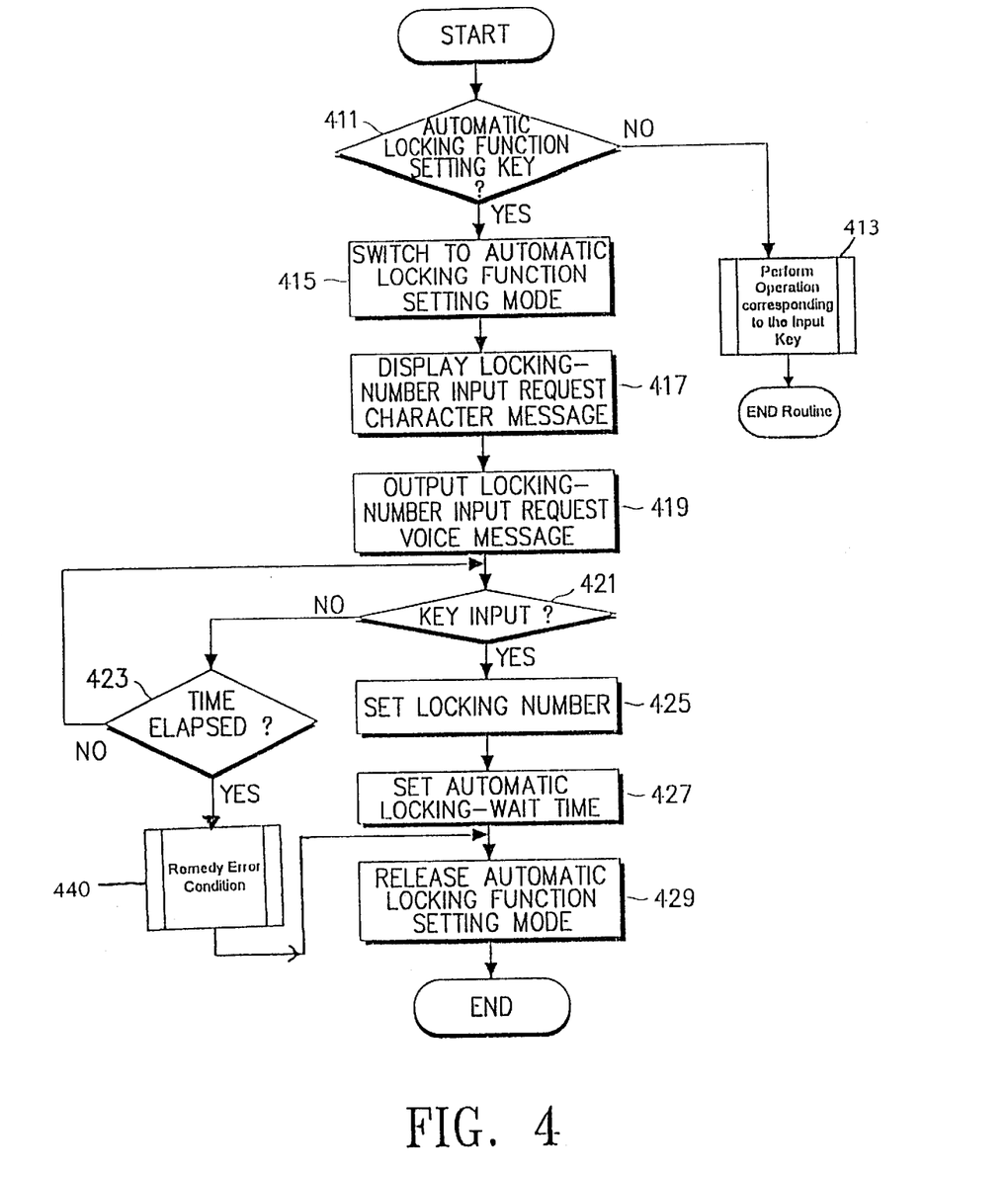
FIG. 4 is a flow chart illustrating a procedure for setting an automatic locking function according to an embodiment of the present invention.

Referring to FIG. 4, there is shown a procedure for setting an automatic locking function according to an embodiment of the present invention. The controller 111 scans the key input device 115 at stated periods in step 411, to determine whether an automatic locking function setting key is input or not. The automatic locking function setting key can be defined by combination of the keys prepared in the key input device 115. Upon receipt of a key other than the automatic locking function setting key, the controller 111 performs an operation corresponding to the input key in step 413 and ends the routine.

Upon receipt of the automatic locking function setting key, the controller 111 switches an operation mode of the mobile telephone to an automatic locking function setting mode in step 415. Thereafter, in step 417, the controller 111 accesses the memory 113 to read a locking-number input request character message such as "Please, input a locking number", and displays the read character message on the display 127. In step 419, the controller 111 accesses the voice memory 117 to read a locking-number input request voice message such as "Please, input a locking number", converts the read voice message to an analog signal, and outputs the converted analog voice signal through the speaker. The controller 111 scans the key input device 115 in step 421 to determine whether a key for locking number setting is input or not. When the key is not input, the controller 111 repeatedly examines in step 423 whether a predetermined time, for example, 5 seconds has elapsed or not. When the predetermined time has elapsed, the controller 111 proceeds to step 429 after remedying the error condition in step 440.

If it is determined in step 421 that the key is input, the controller 111 sets a number corresponding to the input key as a locking number and registers it in the memory 113, in step 425. Thereafter, in step 427, the controller 111 sets an automatic locking-wait time corresponding to locking number setting. The automatic locking-wait time refers to a waiting time required when the mobile telephone is set to an automatic locking mode because no key input is received in the idle mode. Thereafter, the controller 111 releases the automatic locking function setting mode in step 429, and ends the routine.

In the automatic locking function setting procedure of FIG. 4, the automatic locking-wait time is set according to the input locking number.

Figure 5:
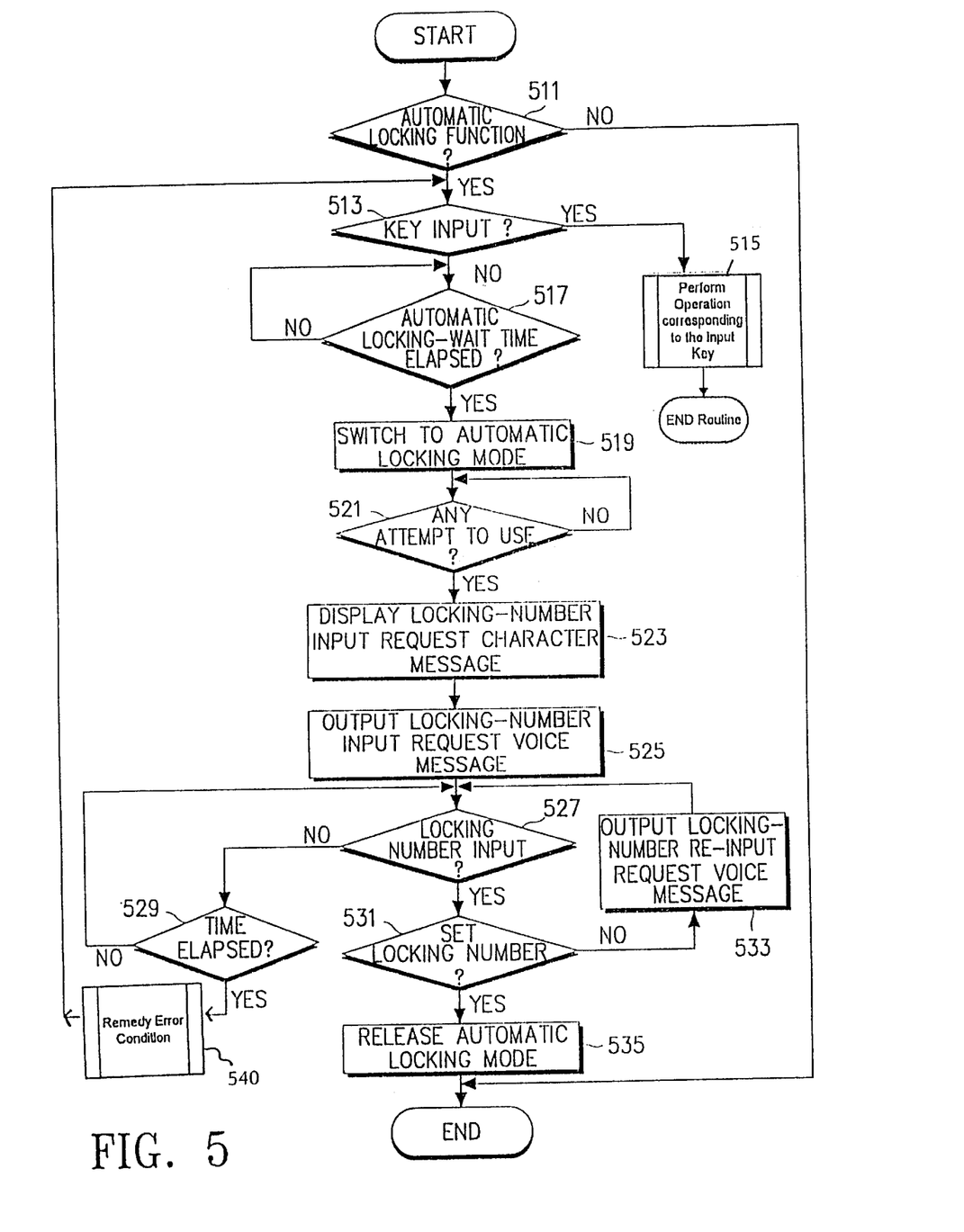
FIG. 5 is a flow chart illustrating an automatic locking/unlocking procedure according to an embodiment of the present invention.

Referring to FIG. 5, there is shown an automatic locking/unlocking procedure according to an embodiment of the present invention. The controller 111 examines in step 511 whether the mobile telephone is set to an automatic locking mode. When the mobile telephone is set to an automatic locking mode, the controller 111 scans the key input device 115 in step 513 to examine whether a key is input. When a key is input, the controller 111 performs an operation corresponding to the key input in step 515 and ends the routine.

However, when no key is input, the controller 111 determines in step 517 whether a predetermined automatic locking-wait time has elapsed or not. When the automatic locking-wait time has elapsed, the controller 111 switches an operation mode of the mobile telephone to an automatic locking mode in step 519. Thereafter, in step 521, the controller 111 determines whether there is the user's attempt to use the mobile telephone. Here, the "user's attempt to use the mobile telephone" refers to the user's attempt to use a call or service function of the mobile telephone by pressing a MENU or SEND key of the key input device 115. If it is determined in step 521 that there is a user's attempt to use the mobile telephone, the controller 111 accesses the memory 113 to read a locking-number input request character message such as "Please, input a locking number", and displays the read character message on the display 127, in step 523. Thereafter, in step 525, the controller 111 accesses the voice memory 117 to read a locking number input request voice message such as "Please, input locking number", converts the read voice message to an analog signal using the audio processor 119, and outputs the converted analog voice signal through the speaker. In step 527, the controller 111 scans the key input device 115 to examine whether a locking number has been input or not. When the locking number is not input, the controller 111 determines in step 529 whether a predetermined time, for example, 5 seconds 20 has elapsed or not. When the predetermined time has elapsed, the controller 111 returns to step 513 after remedying the error condition in step 540.

If a locking number has been input in step 527, the controller 111 determines in step 531 whether the input locking number is identical to a set locking number. When the input locking number is not identical to a set locking number, the controller 111 accesses the voice memory 117 to read a locking number re-input request voice message such as "Incorrect locking number. Please, input the locking number again", converts the read voice message to an analog signal using the audio processor 119, and outputs the converted analog audio signal through the speaker, in step 533. Thereafter, the procedure returns to the step 527. Here, the number of re-inputting the locking number is limited to a predetermined number, and when the re-input number exceeds the predetermined number, the controller 111 generates an error signal.

When it is determined in step 531 that the input locking number is identical to a set locking number, the controller 111 releases the automatic locking mode of the mobile telephone in step 535, and ends the routine.

In the automatic locking/unlocking procedure of FIG. 5, the automatic locking mode is set when there is no key input for the automatic locking-wait time, and the automatic locking mode is released when the locking number is input in the automatic locking mode.

Figure 6A:
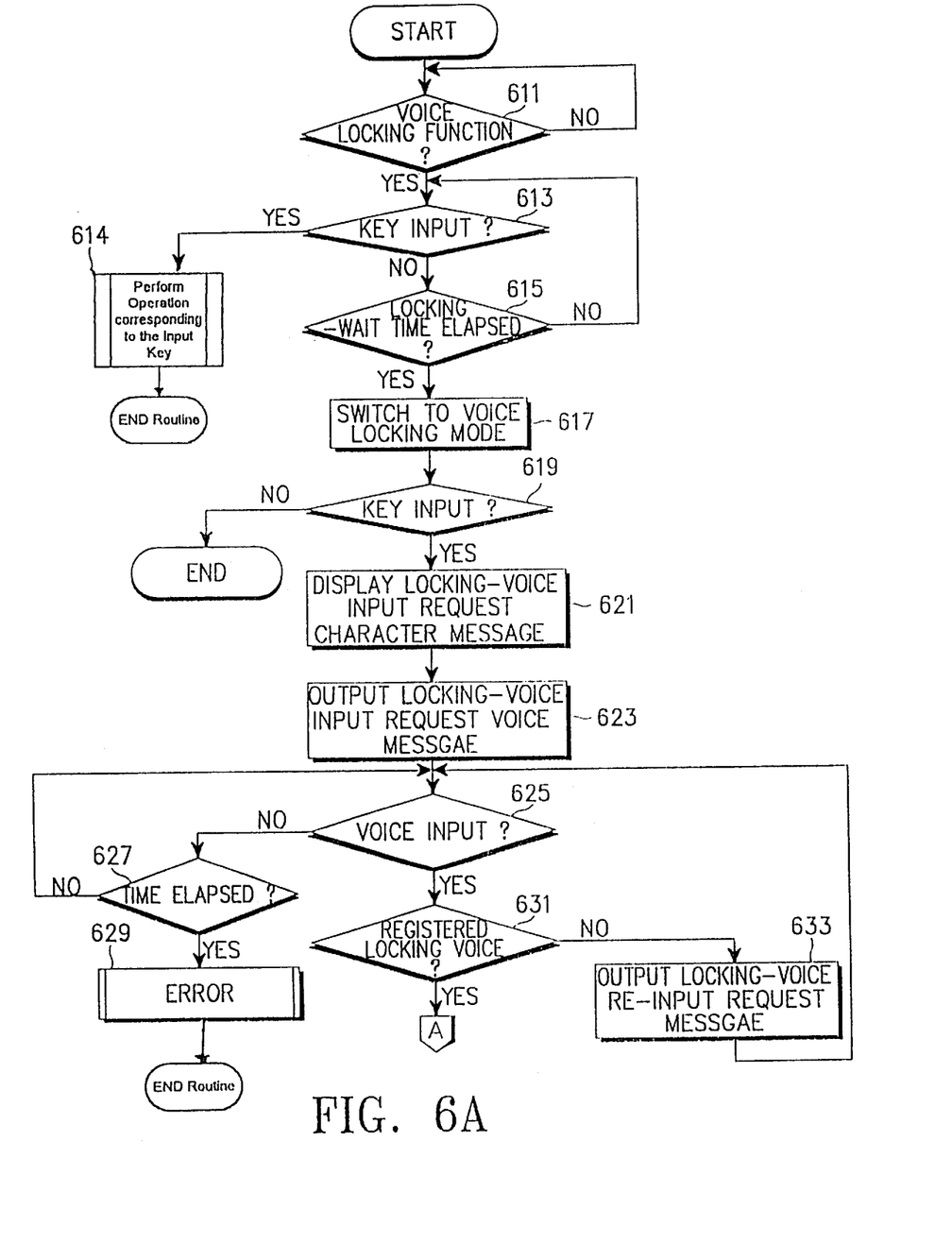
FIGS. 6A and 6B are flow charts illustrating a voice locking/unlocking procedure according to another embodiment of the present invention.
Figure 6B:
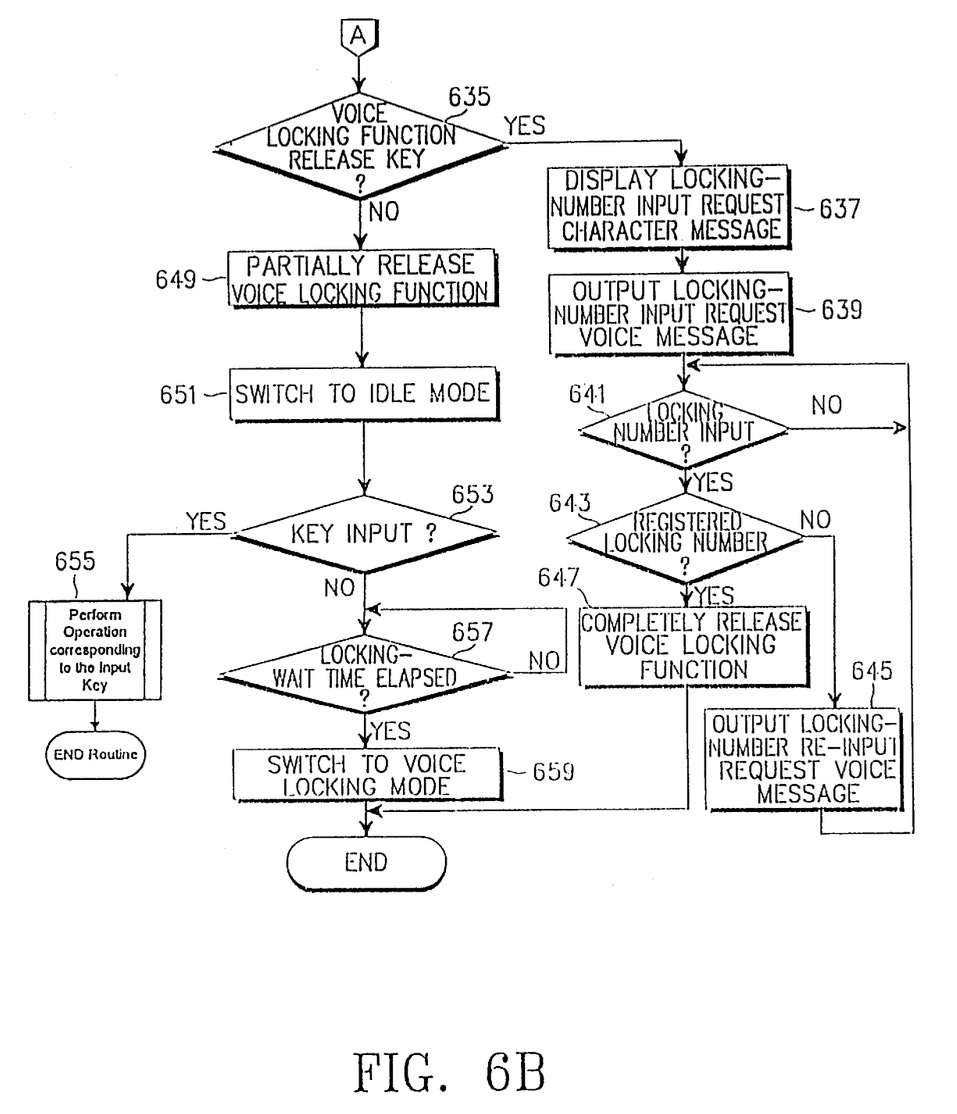

Referring to FIG. 6A, there is shown a voice locking/unlocking procedure according to another embodiment of the present invention. Upon power-on of the mobile telephone, the controller 111 examines in step 611 whether a voice locking function is set or not. When the voice locking function is set, the controller 111 examines in step 613 whether there is key input from the user by scanning the key input device 115. When there is a key input, the controller 111 performs an operation corresponding to the key input in step 614 and ends the routine.

However, when there is no key input, the controller 111 determines in step 615 whether a locking-wait time for the set automatic locking function has elapsed or not. If the time has not elapsed, the procedure goes to step 613. If however, the locking-wait time has elapse, the controller 111 switches an operation mode of the mobile telephone to a voice locking mode for performing the voice locking function, in step 617. Thereafter, the controller 111 determines in step 619 whether there is a key input signal from the key input device 115. Upon receipt of the key input signal, the controller 111 proceeds to step 621. Otherwise, the controller 111 ends the procedure. The operations performed in steps 621 to 659 are identical to the operations performed in steps 317 to 355 of FIGS. 3A and 3B. Therefore, a detailed description will be avoided.

To sum up, by performing the locking/unlocking method using a voice, it is possible to prevent the fraudulent use of the mobile telephone by a person other than the user. In addition, inputting the locking number by voice provides for safer driving operation. Furthermore, the voice locking function is automatically performed again after a lapse of a predetermined time when the voice locking function is released, thus enabling a double locking function. In addition, when there is no key input for a predetermined time after power-on, the mobile telephone is automatically locked. Therefore, it is not necessary for the user to repeat the annoying locking function setting procedure.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for locking and unlocking a mobile telephone, comprising the steps of:

setting a locking mode by receiving a registered locking voice, a registered locking-wait time and a registered locking number;

partially releasing said locking mode when a received locking voice is identical to said registered locking voice;

switching an operation mode of the mobile telephone to an idle mode, after partially releasing the locking function; and switching said operation mode of the mobile telephone back to said locking mode when there is no key input in said idle mode and when said registered locking-wait time has elapsed.

2. The method as claimed in claim 1, further comprising the steps of:

displaying a locking-number input request character message upon receipt of a voice locking function release key and when said input received locking voice is identical to said registered locking voice;

receiving a locking number; and completely releasing said locking mode when said received locking number is identical to said registered locking number.

3. A method for locking and unlocking a mobile telephone, comprising the steps of:

setting a voice locking mode by receiving a registered locking voice, a registered locking-wait time and a registered locking number, and switching an operation mode of the mobile telephone to a voice locking mode;

displaying a locking-voice input request character message upon receipt of a key input in the voice locking mode;

outputting a locking-voice input request voice message;

receiving a locking voice within a predetermined time;

partially releasing the voice locking function when the received locking voice is identical to said registered locking voice, and switching the voice locking mode to an idle mode; and switching the idle mode to said voice locking mode, when there is no key input for the registered locking-wait time in the idle mode.

4. The method as claimed in claim 3, further comprising the steps of:

determining whether a voice locking function release key for completely releasing the voice locking function is received, when the received locking voice is identical to the registered locking voice;

displaying a locking-number input request character message upon receipt of the voice locking function release key;

outputting a locking-number input request message;

receiving a locking number; and completely releasing the voice locking function, when the received locking number is identical to a registered locking number.

5. The method as claimed in claim 3, wherein the voice locking function setting step comprises the steps of:

upon receipt of a voice locking function setting key, switching an operation mode of the mobile telephone to a voice locking function setting mode;

displaying a locking-voice input request character message;

receiving a registered locking voice within a predetermined time registering said received registered locking voice;

displaying a locking-wait time input request character message;

receiving a registered locking-wait time within a predetermined time, and registering the received registered locking-wait time;

displaying a locking-number input request character message for completely releasing the voice locking function;

receiving a registered locking number within a predetermined time, and registering the received registered locking number; and setting the voice locking function in the mobile telephone and releasing the voice locking function setting mode.

6. The method as claimed in claim 5, further comprising the step of outputting a locking-voice input request voice message after displaying the locking-voice input request character message.

7. The method as claimed in claim 5, further comprising the step of outputting a locking-wait time input request voice message after displaying the locking-wait time input request character message.

8. The method as claimed in claim 5, further comprising the step of outputting a locking-number input request voice message after displaying the locking-number input request character message.

9. The method as claimed in claim 5, wherein the locking-wait time is a waiting time required when the mobile telephone is set back to the voice locking mode because no key input is received after the voice locking function is partially released.

10. A method for locking and unlocking a mobile telephone which includes a key input device, comprising the steps of:

setting a locking mode by receiving a registered automatic locking number and a registered automatic locking time input with the key input device;

switching an operation mode of the mobile telephone to a locking mode, when there is no key input from the key input device for said registered automatic locking time; and receiving an automatic locking number when there is a key input in the locking mode, and releasing the locking mode when the received automatic locking number is identical to said registered automatic locking number.

11. The method as claimed in claim 10, wherein the locking mode setting step comprises the step of:

upon receipt of an automatic locking function setting key, setting an operation of the mobile telephone to an automatic locking function setting mode;

receiving a registered automatic locking number; and setting a registered automatic locking time.

12. A method for locking and unlocking a mobile telephone, comprising the steps of:

requesting input of a locking voice, when there is no key input in a voice locking mode where a registered locking voice, a registered locking-wait time and a registered locking number are entered in the mobile telephone;

receiving said locking voice within a predetermined time according to the locking voice input request;

determining whether a voice locking function release key is input, when the received locking voice is identical to said registered locking voice;

upon receipt of the voice locking function release key, requesting input of a locking number;

receiving said locking number within a predetermined time according to the locking number input request; and completely releasing the voice locking function, when the received locking number is identical to said registered locking number.

* * * * *